United States Patent
Park

(10) Patent No.: US 7,065,014 B2
(45) Date of Patent: Jun. 20, 2006

(54) DATA REPRODUCTION CONTROL METHOD FOR OPTICAL DISK DRIVE AND AN OPTICAL DISK DRIVE USING THE SAME

(75) Inventor: Deok-Hwan Park, Kyunggi-Do (KR)

(73) Assignee: DVS Korea Co., Ltd., Kyunggi Do (KR)

( * ) Notice: Subject to any disclaimer, the term of this patent is extended or adjusted under 35 U.S.C. 154(b) by 511 days.

(21) Appl. No.: 10/385,120

(22) Filed: Mar. 10, 2003

(65) Prior Publication Data
US 2004/0151086 A1   Aug. 5, 2004

(30) Foreign Application Priority Data
Feb. 4, 2003   (KR) .................... 10-2003-0006660

(51) Int. Cl.
*G11B 7/00* (2006.01)

(52) U.S. Cl. .................. 369/44.32; 369/53.35

(58) Field of Classification Search .............. None
See application file for complete search history.

(56) References Cited

U.S. PATENT DOCUMENTS

| | | | |
|---|---|---|---|
| 4,761,692 A * | 8/1988 | Yoshida et al. | 386/35 |
| 4,769,801 A | 9/1988 | Funada et al. | |
| 4,823,330 A | 4/1989 | Arter et al. | |
| 5,475,664 A | 12/1995 | Shimizume et al. | |
| 5,663,942 A * | 9/1997 | Ishibashi et al. | 369/53.34 |
| 6,587,407 B1 * | 7/2003 | Nakamura et al. | 369/44.14 |
| 6,888,782 B1 * | 5/2005 | Tateishi et al. | 369/47.18 |
| 2001/0038584 A1 * | 11/2001 | Saito | 369/47.17 |
| 2002/0181349 A1 * | 12/2002 | Yoshioka | 369/44.32 |

* cited by examiner

*Primary Examiner*—Thang V. Tran
*Assistant Examiner*—Tawfik Goma
(74) *Attorney, Agent, or Firm*—Shalom Wertsberger; Saltamar Innovations

(57) ABSTRACT

In a method of controlling data reproduction in an optical disk drive, when a decoding error occurs, decoding is performed by changing a servo parameter. Thus, the decoding errors are reduced while playability is improved. The method of controlling data reproduction in an optical disk drive for reading data stored on an optical disk is performed by monitoring whether a decoding error occurred at a host part, if a decoding error occurred, changing a servo parameter for adjusting balance and/or offset of error signal which input to servo system, and rereading a portion on the optical disk medium where the decoding error occurred using the changed servo parameter and performing decoding.

7 Claims, 4 Drawing Sheets

DATA REPRODUCTION CONTROL METHOD FOR OPTICAL DISK DRIVE AND AN OPTICAL DISK DRIVE USING THE SAME

FIELD OF THE INVENTION

The present invention relates to controlling data reproduction in an optical disk, and the optical disk drive therefor, and more particularly, to a method of controlling data reproduction in an optical disk drive in which, when a decoding error occurs, decoding is performed by changing a servo parameter for adjusting balance and/or offset of error signal input to a servo system so that further decoding errors are reduced.

BACKGROUND

An optical disk drive may be subdivided into a host part, a servo part, and a mechanical part. The host part belongs to the top level and the servo part receives instructions from the host part to drive the mechanical part.

In order to obtain data from an optical disk medium, the host part assigns read addresses and the servo part drives the mechanical part. In general, the driving of the mechanical part includes driving an actuator, driving a spindle, and seeking. Properly actuating the mechanical part reads an analog signal from the optical disk medium.

The servo part slices the radio frequency(RF) signal read from the optical disk medium to a sliced signal, prepares data in a particular format, and transmits the prepared data to the host part. The host part performs demodulation and error correction based on the data to reproduce image and sound.

In the above steps, faults such as data errors, in particular, reproduction of broken images or reproduction of abnormal video, mainly stem from the mechanical part. The data error is frequently generated from a pickup head (PUH) in the mechanical part. The causes for the data errors generated from the pickup head are generally divided into unbalanced servo tracking and a defective optical disk.

First, the unbalanced servo tracking results from a tolerance differences between devices constituting the circuitry involved in the servo loop of an optical signal. That is, the circuitry includes devices such as resistors, capacitors, and amplifiers. Since proper values of the devices are within certain tolerances from one another, unbalanced servo tracking may result.

Second, the defective optical disk results from a defective stamper in a mastering process, a defective substrate in an injection step, or a defective recording layer, during the disk manufacturing process. A scratch made by an end user may make an optical disk defective. Due to the media defect, servo tracking cannot be adequately performed and reproduction of signals from the optical disk may no longer be possible.

Nevertheless, when an error occurs during decoding in a conventional optical disk drive, a servo system has no option but to wait for a given time period. After the given time passes, a partial image is displayed or a previous image frame is reproduced.

SUMMARY OF THE INVENTION

To solve the above and/or other problems, the present invention provides a method for controlling data reproduction in an optical disk drive in which, when a decoding error occurs, decoding is performed by changing a servo parameter for adjusting balance and/or offset of an error signal input to a servo system so that decoding errors are reduced while playability is improved.

Also, the present invention provides an optical disk drive performing the optical disk control method.

According to an aspect of the present invention, a method of controlling data reproduction in an optical disk drive for reading data stored on a optical disk, the method comprises the steps of monitoring whether a decoding error occurred at a host part, if a decoding error occurred, changing a servo parameter for adjusting balance and/or offset of an error signal input to a servo system, and rereading the portion on the optical disk medium where the decoding error occurred, using the changed servo parameter, and decoding the re-read data.

Preferably, the servo parameter changing step comprises the sub-steps of measuring a jitter value of decoded pulses, digitizing the measured jitter value, and changing the servo parameter to minimize the jitter value.

Most preferably, the servo parameter in the servo parameter changing step comprises at least one of servo parameters selected from a list consisting of a parameter to adjust offset or balance of an error signal used for focus servo, and a parameter to adjust balance of an error signal used for tracking servo. Thus, in this specification, the servo parameter is defined as servo parameter for adjusting balance of an error signal input to a servo system.

The step of changing a servo parameter to minimize the jitter value preferably comprises the sub-steps of referring to information on correlation between a jitter value and each servo parameter value, and determining a value of a servo parameter at which the digitized jitter value is optimized.

According to another aspect of the present invention, an optical disk apparatus comprises a servo portion performing at least one servo function to read data stored on an optical disk, and a DSP (Digital Signal Processor) portion performing a digital signal processing, wherein the DSP portion comprises a decoding error controller adapted to determine whether a decoding error occurs, change a servo parameter if decoding error occurred, and reread a portion of an optical disk medium where the decoding error occurred, using the changed servo parameter.

Preferably, the optical disk drive further comprises a jitter evaluation portion adapted for measuring a jitter value of decoded pulses and digitizing the measured jitter value, wherein the decoding error controller changes a servo parameter to optimize the jitter value.

According to an another aspect of the present invention, a method of controlling data reproduction in an optical disk drive for reading data stored on a optical disk, the method comprises the steps of monitoring whether a decoding error occurred at a host part, if a decoding error occurred, changing an EQ (equalization) parameter for finding best boost of RF signal input to an EQ system, and rereading the portion on the optical disk medium where the decoding error occurred, using the changed servo parameter, and decoding the re-read data. EQ portion 226 boost RF signal input using a predetermined gain and the boosted signal is inputted to a data slicer (not shown). Recently, almost all portions to get RF signal are widely regarded as servo portion. Therefore, FIG. 2 denotes servo portion 22 include EQ portion 226. Also, EQ parameter is regarded as a kind of servo parameters in this specification hereinafter.

BRIEF DESCRIPTION OF THE DRAWINGS

The above, and additional features of the present invention, will become more apparent by describing in detail preferred embodiments thereof, with reference to the attached drawings in which.

DETAILED DESCRIPTION OF THE INVENTION

Figure 2:
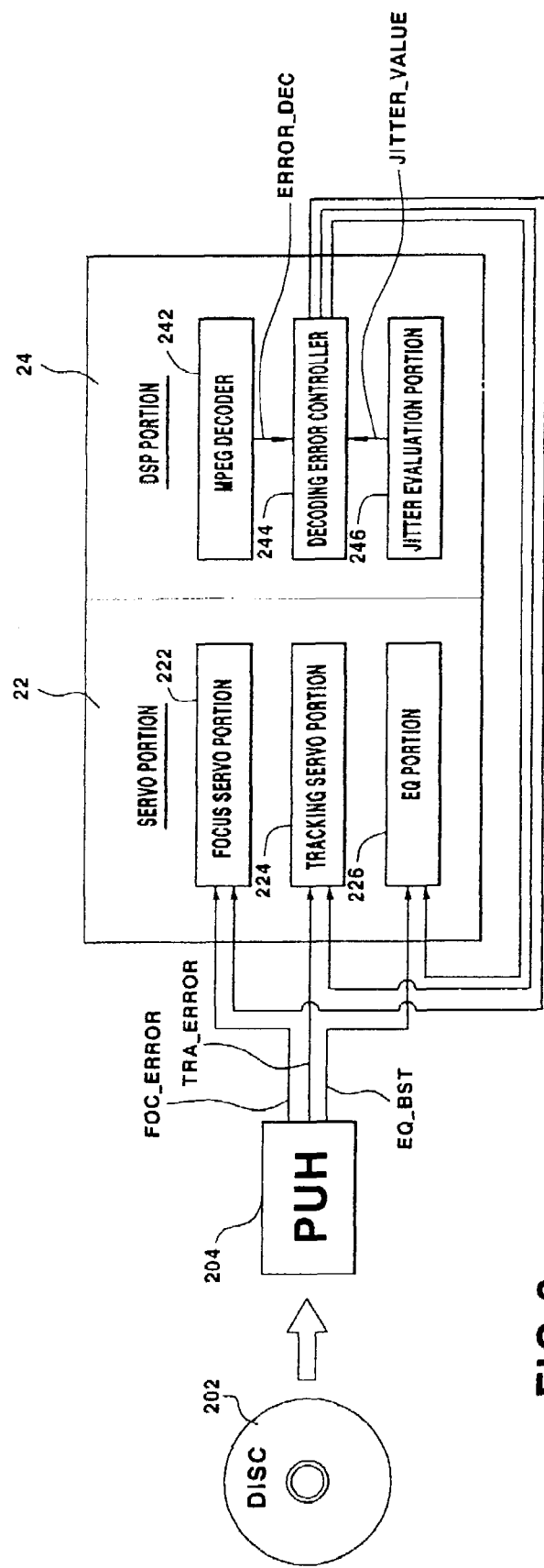
FIG. 2 is a block diagram showing major structure elements of an optical disk drive according to a preferred embodiment of the invention.

Referring to FIG. 2, an optical disk drive according to a preferred embodiment of the present invention includes a pickup head (PUH) unit 204 which reads an optical signal from an optical disk 202, a servo portion 22 which performs a servo function to read data stored on the optical disk 202, and a DSP portion 24 which performs digital signal processing. The servo portion 22 includes a focus servo portion 222, a tracking servo portion 224, and an EQ servo portion 246. The DSP portion 24 includes an MPEG decoder 242, a decoding error controller 244, and a jitter evaluation portion 246.

Figure 1:
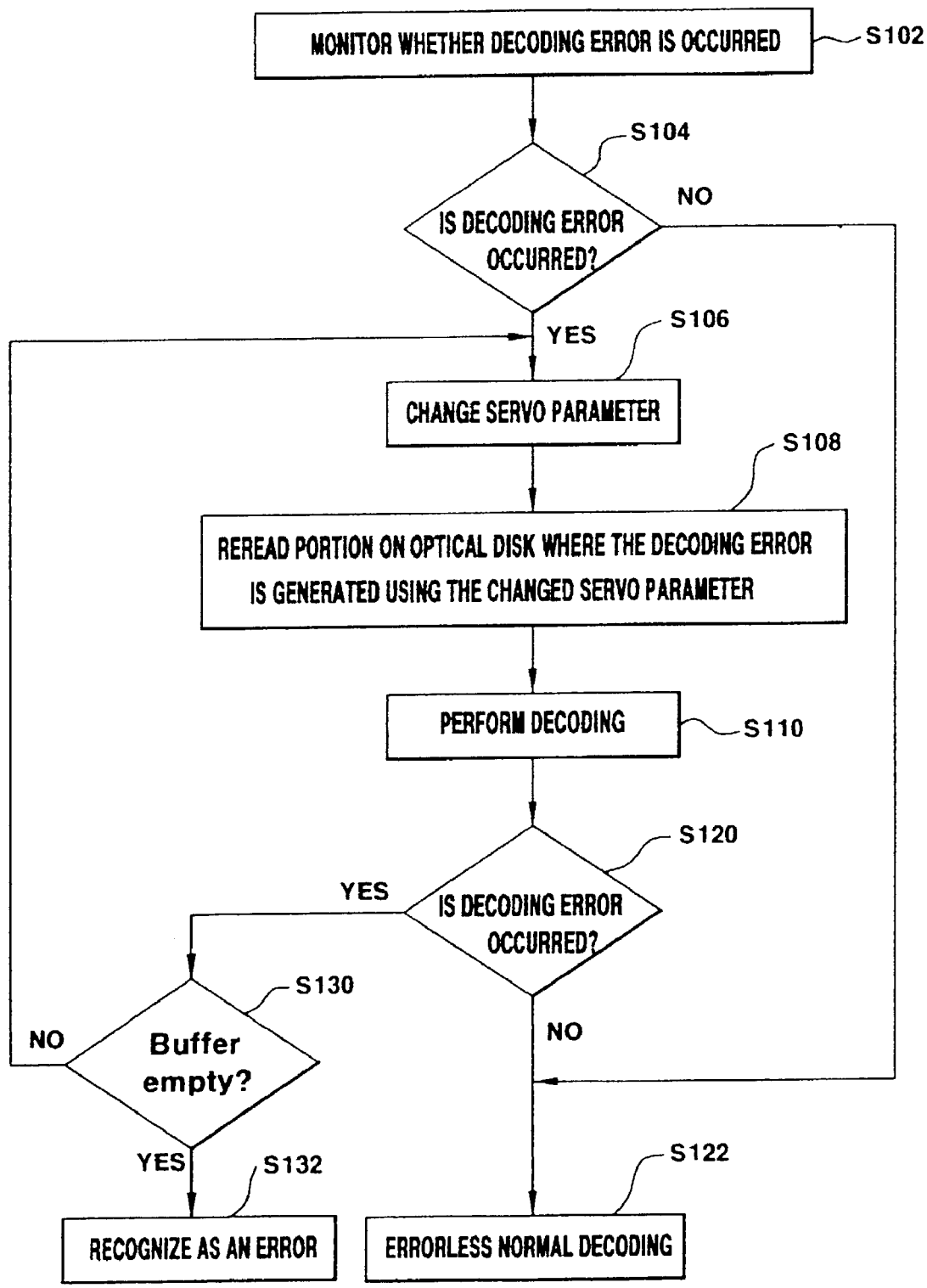
FIG. 1 is a flow chart showing a method of controlling data reproduction in an optical disk drive according to a preferred embodiment of the present invention.

The operation of the optical disk drive having the above structure will now be described with reference to FIG. 1.

First, the decoding error controller 244 detects occurrences of decoding error (S102) and determines whether the decoding error has occurred (S104). When the decoding error is determined to have occurred in S104, a servo parameter is changed (S106). Preferably, decoding error controller 244 receives an ERROR_DEC signal from MPEG decoder 242 when a decoding error occurs. The decoding error controller 244 changes at least one servo parameter. Here, the servo parameter is preferably selected to adjust balance and/or offset of error signals inputted to a servo system, for example, a signal referred to as FOC_ERROR (Focus Error) and TRA_ERROR (Tracking Error) in FIG. 2 for a focus servo and a tracking servo respectively.

Alternatively, the decoding error controller 244 detects occurrences of decoding error (S102) and determines whether the decoding error has occurred (S104). When the decoding error is determined to have occurred in S104, an EQ parameter is changed (not shown in FIG. 1). Preferably, decoding error controller 244 receives an ERROR_DEC signal from MPEG decoder 242 when a decoding error occurs. The decoding error controller 244 changes EQ parameter. Here, the EQ parameter is preferably selected to provide the best boost for the RF signal which would be inputted to the data slicer. The signal referred to as EQ_BST (Equalization Boost) denotes predetermined EQ parameter.

According to an aspect of the present invention, a method of controlling data reproduction in an optical disk drive for reading data stored on a optical disk, the method comprises the steps of monitoring whether a decoding error occurred at a host part, if a decoding error occurred, changing an EQ parameter for achieving the best boost of the RF signal which is inputted to the EQ system, and rereading the portion on the optical disk medium where the decoding error occurred, using the changed servo parameter, and decoding the re-read data. EQ portion 226 boost RF signal input using a predetermined gain and the boosted signal is inputted to the data slicer (not shown). Recently, almost all portions to get RF signal are widely regarded as servo portion. Therefore, FIG. 2 denotes servo portion 22 include EQ portion 226. Also, in this specification, it is regarded that Equalization process is a kind of servo process, and EQ parameter is a kind of servo parameters hereinafter.

Figure 3:
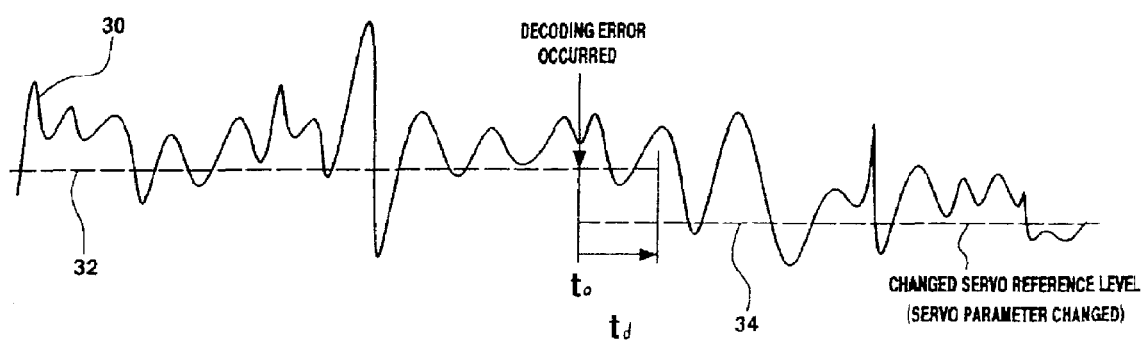
FIG. 3 is a signal view for explaining a step of changing a focus servo parameter.

FIG. 3 shows the step of changing a focus servo parameter. Referring to FIG. 3, the servo parameter for adjusting balance and/or offset of the error signal input to servo system is set to maintain a "0" level 32 of a differential signal 30 representative of the instantaneous focus. However, due to variation in individual optical sensors used to derive the differential signal 30, as well as other operational parameters, setting the focus servo parameter for adjusting the balance and/or offset of the error signal input to the servo system to maintain the "0" lever 32 may not be appropriate. Thus, in the method according to the present invention, for example, the focus servo parameter for adjusting the balance and/or offset of the error signal input to the servo system is changed.

When a decoding error occurs (at time $t_0$) a program routine is performed to change the servo parameter for adjusting the balance and/or offset of the error signal input to the servo system. After a time (at $T_d$) required for the software routine to complete, the focus servo operates with the changed servo reference level 34.

In this case, experiments show-that, compared to a case in which the focus servo is set to maintain the "0" level 32, an RF signal read from an optical disk medium is improved when the focus servo is set to maintain a different focus servo parameter.

In the above preferred embodiment, although the parameter to adjust the servo parameter for the focus servo is changed, the same principle can be applied to the tracking servo or the EQ servo. That is, according to the present invention, the servo parameter for the focus servo, tracking servo or the EQ servo, or a combination thereof, may be modified. When the servo parameter changes in a plurality of steps and the decoding retrial are performed by changing a variety of the servo parameter, servo parameters are preferably changed sequentially according to a preset order. Also, in the servo parameter change and the decoding retrial, various servo parameters can be sequentially changed according to a preset order.

How to change the servo parameter is shown below.

In the present preferred embodiment, the jitter evaluation portion 246 measures jitter values of decoded pulses and digitizes the measured jitter values. The decoding error controller 244 changes the servo parameter so that the jitter value JITTER_VALUE evaluated by the jitter evaluation portion 246 is minimized. That is, the decoding error controller 244 refers to a predetermined correlation information between a jitter value and each servo parameter, and determines the appropriate value for each servo parameter to optimize the digitized jitter vale.

Figure 4:
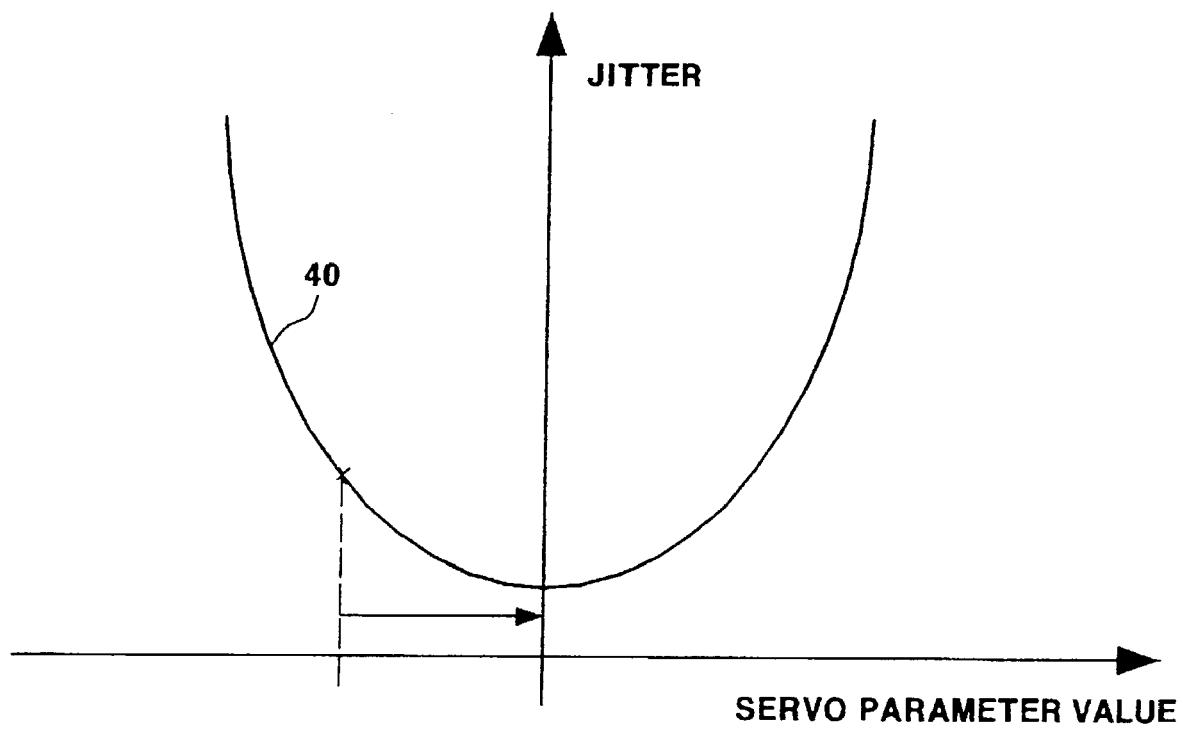
FIG. 4 is a graph for explaining a step of changing a servo parameter with reference to a jitter value.

FIG. 4 shows the step of changing a servo parameter by referring to a jitter value. Referring to FIG. 4, after determining the correlation between the servo parameter and the jitter value through prior experiments, when a decoding error occurs, a servo parameter value α to minimize the jitter value is determined. That is, given that a servo parameter after change is $PARAM_{mod}$, a servo parameter before change is $PARAM_{org}$, and a difference value is α, the relationship therebetween can be expressed as in the following equation.

$$PARAM_{mod} = PARAM_{org} + \alpha \quad \text{[Equation 1]}$$

In a conventional optical disk drive, servo process is performed using error signals which are inputted to the servo system as is. However, according to the present invention, decoding error controller 244 make changes to the error signal input of the servo system. The amount of changes is defined as α.

Next, the decoding error controller 244 reads a portion on an optical disk medium where a decoding error occurs by controlling the servo portion 22 to read the portion on the optical disk medium where the decoding error occurred, using the changed servo parameter $PARAM_{mod}$ (S108).

Next, the MPEG decoder 242 performs decoding using reread data (S110). Then, the MPEG decoder 242 determines whether a decoding error occurred when decoding using the reread data (S120). If the decoding error did not occur, an errorless normal decoding (S122) has been performed. If a decoding error did occur, the read buffer is checked to determine if it is empty (S130). If the buffer is not empty, the servo parameter is changed in a preset order and decoding is retried. If the buffer is determined empty in Step S130, the corresponding frame is recognized as an error frame (S132). Because the speed of disk reading in recent normal optical disk drives is at least two times faster than that of MPEG decoding, the above-described servo parameter changing and decoding retrial can be performed during the excess time.

While, in the conventional method of controlling data reproduction in an optical disk drive, when an error occurs during decoding, there is no option to wait for predetermined time period, according to the above method of controlling data reproduction in an optical disk drive, when an error occurs, a servo parameter is changed and the portion where the decoding error occurred is reread using the changed servo parameter and decoding is performed again. Thus, since decoding errors are actively processed, it can be seen through actual tests that the decoding errors are reduced so that playability is improved.

The above-described method of controlling data reproduction in an optical disk drive according to the present invention can be realized by a computer program. The computer program is read by a microcomputer so that the method of controlling data reproduction in an optical disk drive according to the present invention is executed. Also, the computer program can be stored on a semiconductor memory such as a ROM, an EPROM, an EEPROM, and a flash memory, or downloaded through the Internet or other communications networks.

While this invention has been particularly shown and described with reference to preferred embodiments thereof, it will be understood by those skilled in the art that various changes in form and details may be made therein without departing from the spirit and scope of the invention.

As described above, in the method of controlling reproduction in an optical disk drive according to the present invention, when an error occurs during decoding, a servo parameter is changed. Then, a portion on an optical disk medium is reread by applying the changed servo parameter and decoding is retried so that playability is improved.

What is claimed is:

1. A method of controlling data reproduction in an optical disk drive for reading data stored on an optical disk medium, the method comprising steps of:

monitoring whether a decoding error occurred, in an MPEG decoder at a host part of said disk drive;

if a decoding error occurred, and if a read buffer is empty changing a servo parameter for adjusting balance and/or offset of an error signal input to a servo system;

rereading data on a portion of the optical disk medium where the decoding error occurred, using the changed servo parameter; and, performing decoding of the reread data;

wherein said servo parameter is selected from a group consisting of a focus parameter, a tracking servo parameter, an EQ parameter, or a combination thereof.

2. A method as claimed in claim 1, wherein the servo parameter changing step comprises the sub-steps of:

measuring a jitter value of decoded pulses;

digitizing the measured jitter value; and changing a servo parameter for adjusting balance and/or offset of an error signal input to the servo system to minimize the jitter value.

3. A method as claimed in claim 2, wherein the step of changing a servo parameter to minimize the jitter value comprises the sub-steps of:

referring to information on correlation between a jitter value and a servo parameter; and determining a value of a servo parameter for adjusting balance and/or offset of error signal which input to servo system at which digitized jitter value is minimized.

4. A method as claimed in claim 3 wherein said servo is selected from a group comprising a focus servo, a tracking servo and an EQ servo, or a combination thereof.

5. An optical disk drive apparatus comprising:

a servo portion adapted to perform a servo function to facilitate reading data stored on an optical disk medium; and a DSP portion adapted to perform a digital signal processing, wherein the DSP portion comprises a decoding error controller for controlling the servo portion or a portion thereof, the controller constructed to monitor whether a decoding error occurred in an MPEG decoder of a host part of said optical disk drive, and to check if a read buffer is empty; the error controller further constructed to change a servo parameter when a decoding error occurred if the buffer is not empty, and reread data from the portion on an optical disk medium where the decoding error occurred using the changed servo parameter;

wherein said changed servo parameter is selected from a group consisting of a focus servo parameter, a tracking servo parameter, an EQ servo parameter, or a combination thereof.

6. An optical disk drive as claimed in claim 5, further comprising a jitter evaluation portion adapted to measure a jitter value of decoded pulses and digitizing the measured jitter value, wherein the decoding error controller changes a servo parameter to minimize the jitter value.

7. An optical disk drive as claimed in claim 5, wherein the decoding error controller is adapted to utilize information on correlation between a jitter value and a servo parameter value and determines a value of a servo parameter at which digitized jitter value is optimized.

* * * * *